US008023506B2

(12) United States Patent
Wei (10) Patent No.: US 8,023,506 B2
(45) Date of Patent: Sep. 20, 2011

(54) METHOD AND PROVIDER EDGE DEVICE FOR ADVERTISING AND PROCESSING PSEUDO-WIRE INFORMATION (75) Inventor: Wei Wei, Hangzhou (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 323 days.

(21) Appl. No.: 12/373,862

(22) PCT Filed: Apr. 25, 2008

(86) PCT No.: PCT/CN2008/070814
§ 371 (c)(1),
(2), (4) Date: Jan. 14, 2009

(87) PCT Pub. No.: WO2008/131686
PCT Pub. Date: Nov. 6, 2008

(65) Prior Publication Data
US 2009/0327797 A1 Dec. 31, 2009

(30) Foreign Application Priority Data
Apr. 28, 2007 (CN) .......................... 2007 1 0097243

(51) Int. Cl.
H04L 12/28 (2006.01)
(52) U.S. Cl. .................... 370/389; 370/395.53; 370/410
(58) Field of Classification Search .................. None
See application file for complete search history.

(56) References Cited

U.S. PATENT DOCUMENTS
2004/0156313 A1  8/2004 Hofmeister et al.
2007/0058602 A1* 3/2007 Shimada ....................... 370/340
2008/0175234 A1* 7/2008 Li .................................. 370/389

FOREIGN PATENT DOCUMENTS
| CN | 1859302 | | 11/2006 |
| CN | 1866859 | * | 11/2006 |
| CN | 1878135 | | 12/2006 |
| CN | 1929392 | A | 3/2007 |
| CN | 101072158 | A | 11/2007 |
| JP | 2006-311427 | A | 11/2006 |
| WO | 2007/022640 | A1 | 3/2007 |

OTHER PUBLICATIONS

Martini et al. "RFC 4447 Pseudowire Setup and Maintenance using the Label Distribution Protocol (LDP)", Apr. 2006.*
Andersson et al. "RFC 3036 LDP Specification", Jan. 2001.*

(Continued)

Primary Examiner — Chirag Shah
Assistant Examiner — Jenkey Van (57) ABSTRACT

The present invention discloses a method for advertising and processing pseudo-wire (PW) information, which comprises: the sending provider edge (PE) device using two or more methods to group PWs, identifying the group identifier assigned to each PW with each grouping method, and sending all group identifiers of each PW to the receiving PE device; the sending PE device sending to the receiving PE device the notification message that carries information identifying the affected PW group, and the receiving PE device identifying the PWs belonging to the affected PW group according to the received notification. The present invention also discloses the sending and receiving PE devices for advertising and processing PW information. The method and the devices of the present invention can support grouping PWs with more than one method, allowing for flexible use of PW group-based messaging and message processing.

20 Claims, 5 Drawing Sheets

OTHER PUBLICATIONS

Martini, L, (Ed.), et al., "Pseudowire Setup and Maintenance Using the Label Distribution Protocol (LDP)", Network Working Group RFC4447, Apr. 2006, pp. 1-30.

"Research and implementation of emulation service over MPLS based on Pseudo wire emulation edge-to-edge protocol", Master Thesis of Northwestern Polytehnical University published Mar. 27, 2006 and English Abstract thereof.

* cited by examiner

METHOD AND PROVIDER EDGE DEVICE FOR ADVERTISING AND PROCESSING PSEUDO-WIRE INFORMATION

TECHNICAL FIELD

This application relates to Multi-Protocol Label Switching (MPLS) technology and, more particularly, to a method for advertising pseudo-wire (PW) information and the provider edge (PE) devices in MPLS networks.

BACKGROUND

MPLS Layer-2 virtual private network (MPLS L2VPN) implements L2VPN across an MPLS backbone by encapsulating user packets in MPLS labels. Virtual private LAN service (VPLS) and virtual private wire service (VPWS) are two approaches to MPLS L2VPN.

Both VPLS and VPWS fit into the PW emulation edge-to-edge (PWE3) architecture. In the PWE3 architecture, a PW is a dedicated virtual connection from PE to PE, which is achieved by using encapsulation technology. In VPLS/VPWS applications, VPLS/VPWS access is provided by PEs. Multiple PWs can share one physical link while being independent of each other. Each PW contains two unidirectional virtual circuits (VCs) in different directions. After the two VCs are established, a bidirectional PW is established.

Currently, a PW can be established manually, through Martini MPLS L2VPN, or through Kompella MPLS L2VPN. The Martini MPLS L2VPN is achieved by extending the Label Distribution Protocol (LDP) while the Kompella MPLS L2VPN is achieved by extending the Border Gateway Protocol (BGP). Among the three approaches, Martini MPLS L2VPN has gained wide application because it avoids the limitation of manual setup in network size and the deficiency of Kompella MPLS L2VPN in deployment flexibility.

To guide Martini signaling implementations, the IETF drafted RFC 4477. According to the RFC, The PEs in the VPLS or VPWS must first establish LDP neighborhoods and then send Label Mapping messages to each other to advertise local PW information.

In a Label Mapping message, each PW entry contains a PW ID, a PW label, and a set of interface parameters. RFC 4447 defines two types of type-length-value (TLV) attributes for PW identification: PWid FEC and Generalized PWid FEC. The PWid FEC uniquely identifies a PW by using the combination of PW type and PW ID (LDP neighborhood information in the messages may be required in addition), and identifies a PW group by using the group ID. Generalized PWid FEC uniquely identifies a PW by using the combination of AGI, SAII and TAII, and identifies a PW group by using the PW Grouping ID TLV.

The methods used by the two FECs to identify groups of PWs are called wildcard identification. The Group ID and the PW Grouping ID TLV used by the two FECs are called PW group identifiers. PW grouping is done by the sender of Label Mapping messages and the transmitted label mappings already carry the PW identifiers of PWs. The PE that receives the label mappings saves the Group ID or PW Grouping ID TLV, that is, the PW group identifier, for each PW. When the receiving PE device receives a wildcard message, it can use the group identifier of PW to identify whether a PW belongs to the PW group affected by the message.

After a PW is established, the PEs at the ends of the PW can transmit packets on it. Because the PW may fail due to the attachment circuit (AC) failure of VPWS or public network LSP failure of VPLS or any other reason, the PEs need to transmit PW unreachable messages to notify the remote PEs of the PW failure.

As described in RFC 4447, the PW unreachable message must contain the PW ID for identifying the unreachable PW. To improve transmission efficiency, wildcard identification, that is, the PW group identifier, can be used in PW unreachable messages to notify the remote endpoint of affected PWs in groups.

In present application, PW grouping is achieved by using the Group ID or PW Grouping ID TLV in the PW identifier, and only one PW grouping method can be used. This can hardly cover various failure causes and constrains the use of wildcard messaging.

Suppose PW groups are divided by physical ports connected to ACs. When a physical port fails causing the failure of all PWs on it, the PE can use a wildcard message to notify its remote peer of the PW failure. When a public network LSP fails causing the failure of all PWs on it, the PE cannot do this. Rather, the PE has to send one message to the remote peer for each failed PW.

If PW groups are divided by public network LSPs, the PE can use a wildcard message to notify its remote peer of the PW failures caused by a public network LSP failure. However, to notify of the PW failures caused by a physical port failure, the PE has to send a PW unreachable message for each PW.

Thus, single-method based PW grouping limits the use of wildcard messages, decreasing efficiency. In cases where a PE has to send a message for each unreachable PW, the delay of unreachable PW advertisement is increased and system resources are wasted.

SUMMARY OF THE INVENTION

The present invention provides a method for advertising and processing PW information to take full advantage of PW grouping for message transmission.

The present invention also provides a transmitting PE device and a receiving PE device for advertising and processing PW information, which support multi-method based PW grouping, allowing for better flexibility.

An embodiment of the present invention comprises:

A method for advertising and processing PW information, which further comprises:

the sending PE device using two or more methods to assign a PW to different PW groups, identifying the group identifier assigned to the PW with each method, and sending all group identifiers of the PW to the receiving PE device;

the sending PE device sending to the receiving PE device a wildcard notification message, which carries the information identifying the PW group affected by the message; after receiving the notification message, the receiving PE device identifying which PWs are affected.

Preferably, the sending PE device sending to the receiving PE device the group identifiers of the PW comprises:

constructing a PW group identifier sequence in a pre-set format for the PW with all the identified group identifiers of the PW;

sending to the receiving PE device the PW group identifier sequence in a group identifier advertisement message.

Preferably, sending to the receiving PE device a wildcard notification message, which carries the information identifying the PW group affected by the message, comprises:

carrying in the notification message the target PW group identifier sequence and mask identical to the PW group identifier sequence in format and length, wherein, in the target PW group identifier sequence, the segment for the concerned grouping method is filled in with the identifier of the affected PW group, and the group identifier bits for the unconcerned grouping methods are set to 0;

in the mask, the group identifier bits for the grouping method of the affected PW group are set to 1, and the group identifier bits for the unconcerned grouping methods are set to 0.

Preferably, after receiving the notification message, the receiving PE device identifying which PWs are affect comprises:

bitwise ANDing the saved PW group identifier sequence of the PW being traversed with the received mask;

comparing the bitwise AND result with the received target PW group identifier sequence. If they are identical, the receiving PE device identifies that the PW being traversed is affected; if not, unaffected.

Preferably, the sending PE device sending to the receiving PE device the group identifiers of the PW comprises:

the sending PE device sends to the receiving PE device all the group identifiers of the PW and information about the related grouping methods in a message used for advertising group identifiers.

Preferably, said sending information about the related grouping methods is to use a field in the PW group identifier advertisement message to indicate the grouping methods corresponding to the group identifiers of the PW, or, to order the PW group identifiers in a pre-set way that the order by itself indicates the mappings of group identifiers and grouping methods.

Preferably, after receiving the notification message, the receiving PE device identifying which PWs are affect comprises:

identifying the grouping method of the affected PW group according to the received notification;

traversing each PW from the sending PE device to compare the PW group identifier assigned with the identified grouping method to the PW with the group identifier carried in the notification message. If they are identical, the PW being traversed is an affected PW; if not, an unaffected PW.

Preferably, the group identifier advertisement message is the Label Mapping message or a newly-defined type of message.

A kind of sending PE device for advertising and processing PW information, comprising the configuration unit and the first interface unit. Wherein, the configuration unit uses two or more grouping methods as per configuration to assign a PW to different PW groups, identifies the group identifier assigned to the PW with each grouping method, and delivers to the first interface unit all group identifiers assigned to the PW;

the first interface unit sends all received group identifiers out. In addition, the first interface unit functions to send PW group-based notification messages, each carrying information identifying the affected PW group.

Preferably, the configuration unit further orders all group identifiers in the pre-set format to construct a PW group identifier sequence, and delivers the PW group identifier sequence in the PW group identifier advertisement message to the first interface unit.

The first interface unit sends the received PW group identifier advertisement message out. The first interface unit also functions to send notification messages, each carrying a target PW group identifier sequence and mask identical to the PW group identifier sequence in format and length.

Preferably, the configuration unit further sends to the first interface unit the grouping methods corresponding to the group identifiers of each PW.

The first interface unit further sends the mappings of group identifiers and grouping methods. In addition, the unit functions to send notification messages, each carrying the identifier of the affected PW group and information about its grouping method.

A kind of receiving PE device for advertising and processing PW information, comprising the second interface unit, the processing unit, and the storage unit. Wherein, the second interface unit receives all group identifiers of the PW and delivers them to the storage unit. It also receives PW group-based notification messages, each carrying information about the affected PW group, and delivers them to the processing unit;

the storage unit saves all the group identifiers of the PW;

the processing unit receives the notification messages from the second interface unit, and identifies which PWs are affected according to the messages.

Preferably, the second interface unit receives the group identifier advertisement message, and sends to the storage unit the PW group identifier sequence in the pre-set format.

The storage unit saves the PW group identifier sequence.

The processing unit further extracts from the notification message the target PW group identifier and mask identical to the PW group identifier sequence in format and length to identify the affected PWs.

Preferably, the second interface unit further receives information about the grouping methods corresponding to the group identifiers, and delivers them to the storage unit.

The storage unit further saves the grouping method corresponding to each group identifier.

The processing unit further extracts from the notification message the PW group identifier and its grouping method information to identify which PWs are affected.

As the above solution shows, the PW advertisement and processing with the present invention supports multi-method based PW grouping, wherein the sending PE device assigns a PW to groups created with different grouping methods, identifies the group identifier assigned to the PW with each grouping method, and sends all group identifiers of the PW to the receiving PE device. The receiving PE device thus learns to which PW group a PW belongs when a certain grouping method is used. When an event occurs affecting a group of PWs, the sending PE device can send a PW group-based notification carrying information about the affected PW group. Upon receiving the notification, the receiving PE device identifies the affected PWs based on the received PW group information and the saved group identifiers sent by the sending PE device for each PW. Then, the message can be applied to the identified PWs. By supporting multi-method PW grouping, PW group-based messaging is fully utilized.

DETAILED DESCRIPTION OF THE INVENTION

To clarify the purposes, technical measures and advantages of the present invention, the following part describes the present inventions in detail together with figures.

The basic idea of the present invention is that a PE device groups PWs with different methods and sends to the receiving PE device the set of PW group identifiers thus assigned to each PW, with each PW group identifier corresponding to a grouping method. When the receiving PE device receives a PW-group based message, it uses the PW group information in the message and the saved PW group identifiers of each PW to identify which PWs are affected by the received message.

Figure 1:
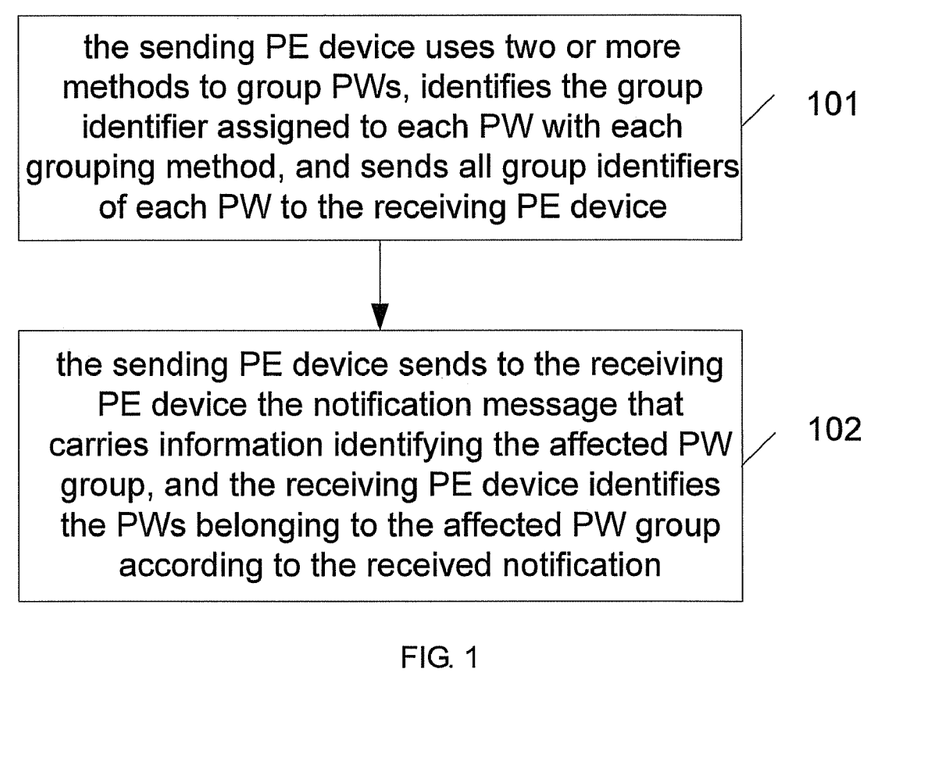
FIG. 1 is a flow chart illustrating a method for advertising and processing PW information in accordance with the present invention.

FIG. 1 is a flow chart illustrating a method for advertising and processing PW information in accordance with the present invention. As shown in FIG. 1, the method comprises these steps:

At step 101, the sending PE device uses two or more methods to assign a PW to different PW groups, identifies the PW group identifier assigned to the PW with each method, and sends all group identifiers assigned to the PW to the receiving PE device.

At step 102, the sending PE device sends to the receiving PE device a PW group-based notification message, which carries the information identifying the affected PW group. After receiving the notification message, the receiving PE device identifies which PWs are affected.

Figure 2:
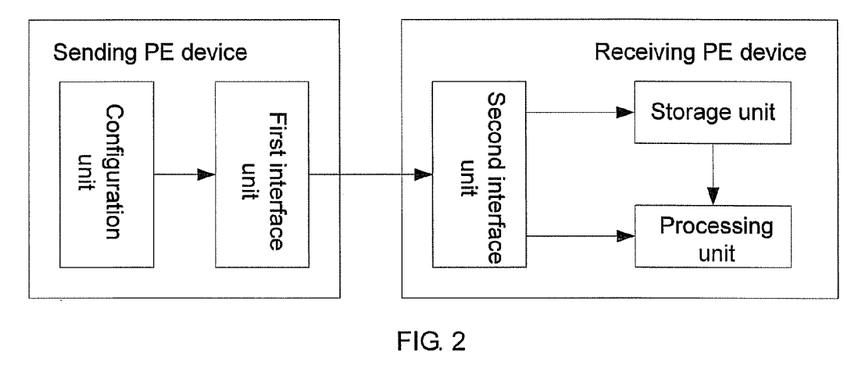
FIG. 2 is an architecture illustrating the transmitting and receiving PE devices that advertise and process PW information in accordance with the present invention.

FIG. 2 is an architecture illustrating the transmitting and receiving PE devices for advertising and processing PW information. The illustrated PE devices can be used to implement the flow shown in FIG. 1. As shown in FIG. 2, the sending PE device contains the configuration unit and the first interface unit, and the receiving PE device contains the second interface unit, the processing unit, and the storage unit.

Wherein, in the sending PE device, the configuration unit assigns a PW to PW groups with two or more grouping methods as per configuration, identifies the PW group identifier assigned to the PW with each method, and delivers to the first interface unit all group identifiers assigned to the PW. The first interface unit sends out the group identifiers of the PW received from the configuration unit. In addition, the first interface unit functions to send out PW group-based notification messages to notify of affected PW groups.

Wherein, in the receiving PE device, the second interface unit receives all group identifiers of the PW and delivers them to the storage unit. The second interface unit also functions to receive PW group-based notification messages carrying information about affected PW groups, and deliver the notification messages to the processing unit. The storage unit saves all the group identifiers of the PW. The processing unit also functions to receive the notification messages from the second interface unit, and identify which PWs are affected according to the messages.

In the aforesaid method and PE devices, two approaches are available for the receiving PE device to record and process the set of group identifiers of a PW. In approach 1, the receiving PE device records the set of group identifiers as they are, without interpreting them. When it traverses a PW, all the group identifiers are traversed. In approach 2, the receiving PE device identifies the group identifiers and their grouping methods, and records them according to established conventions. Thus, when traversing a PW, the receiving PE device traverses only concerned group identifiers. The following provides two embodiments to describe the two approaches. The following embodiments take wildcard PW unreachable/reachable messages as examples for PW group-based messages.

Embodiment 1

Figure 3:
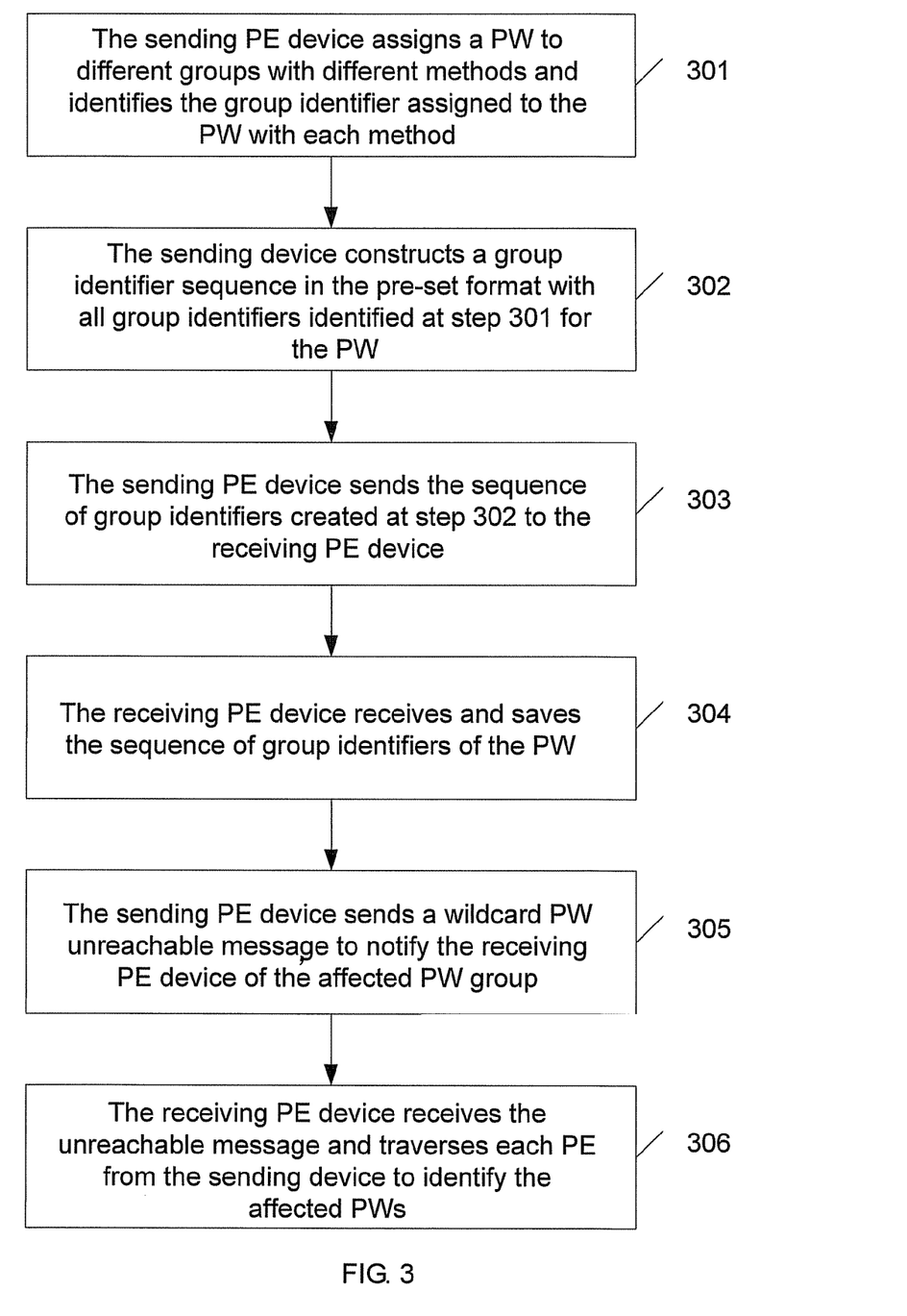
FIG. 3 is a flow chart illustrating a method for advertising and processing PW information in accordance with embodiment 1 of the present invention.

FIG. 3 is a flow chart illustrating a method for advertising and processing PW information in accordance with embodiment 1 of the present invention. The method can be implemented in the sending and receiving PE devices as shown in FIG. 2. As shown in FIG. 3, embodiment 1 comprises these steps:

At step 301, the sending PE device uses different grouping methods to assign a PW to PW groups, and identifies the group identifier assigned to the PW with each grouping method.

In practice, which PW grouping methods are adopted depends on network scenarios. However, whichever method is used, the number of PW groups should be limited. This is because PW grouping is intended to reduce message interactions, a large amount of PW groups may offset this benefit. For a PW, different grouping methods will assign different group identifiers.

At this step, the configuration unit in the sending PE device assigns the PW to different groups as per configuration, and identifies the group identifier assigned to the PW with each grouping method. The configuration can be performed by users at the configuration interface of the configuration unit, and the configuration results are saved in the configuration unit.

At step 302, the configuration unit in the sending PE device constructs a group identifier sequence in the pre-set format with all group identifiers identified at step 301 for the PW. Wherein, the configuration unit constructs a group identifier sequence in the pre-set format with all group identifiers of the PW, which comprises assigning a segment of bits to each PW grouping method and filling in each segment of bits with the corresponding group identifier. For example, Table 1 shows a 32-bit PW group identifier sequence field, of which the first 16 bits are the group identifier assigned with grouping method I, and the last 16 bits are the group identifier assigned with grouping method II.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Group I ID           |          Group II ID          |
+-+-+-+-+-+-+-+-+-+-+-+-+-+-+-+-+-+-+-+-+-+-+-+-+-+-+-+-+-+-+-+-+
```

Wherein, the pre-set format can be defined by users at the configuration interface of the configuration unit.

At step 303, the sending PE device sends the PW group identifier sequence constructed at step 302 to the receiving PE device.

Wherein, the sending PE device can send the PW group identifier sequence when establishing the PW, before or after the PW is established. To be specific, the configuration unit delivers the PW group identifier sequence to the first interface unit and the first interface unit sends the sequence out in a message already defined in the protocol such as the Label Mapping message or a newly defined message.

If the PW group identifier sequence is carried in the Label Mapping message, it can be written into the Group ID field of the PWid FEC element, or together with its length and type, into the PW Grouping ID TLV of the Generalized PWid FEC element.

Using the Group ID field of the PWid FEC element to carry PW group identifier sequence allows for little extensibility because the field is fixed to 32 bits. In comparison, the PW Grouping ID TLV of the Generalized PWid FEC has no such a limit, allowing for better extensibility.

At step 304, the receiving PE device receives and saves the group identifiers of the PW.

Wherein, the sending PE device notifies the receiving PE device of the affected PW group through the first interface unit. In this embodiment, the sending PE device does this by carrying the target PW group identifier sequence and mask in the PW unreachable message. Wherein, the PW unreachable message can be a Label Withdraw message or a Notification message containing the PW Status TLV. The target PW group identifier sequence is used to indicate the affected PW group, and the mask is used to indicate the grouping method. In this embodiment, a mask must be used to indicate the grouping method because the receiving PE device does not know which bits in the received PW group identifier sequence are used for which grouping method or what they stand for.

To be specific, the format of the target PW group identifier sequence can take the same format of the PW group identifier sequence. In the target PW group identifier sequence field, the bits for the grouping method of the affected PW group are filled in with the identifier of the affected group while the bits for the other unconcerned grouping methods are set to 0. Assume the format of the target PW group identifier sequence is as shown in Table 1, the group identifier of the affected PW group is 1100100b, and the adopted grouping method is Group II. Then, the target PW group identifier sequence is as shown in Table 2.

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0 0 0 0 0 0 0 0 0 0 0 0|0 0 0 0 0 0 0 0 0 1 1 0 0 1 0 0|
+-+-+-+-+-+-+-+-+-+-+-+-+-+-+-+-+-+-+-+-+-+-+-+-+-+-+-+-+-+-+-+-+
```

Wherein, the first interface unit of the receiving PE device receives the PW group identifier sequence and directly saves the sequence to the storage unit without attempting to interpret its meanings.

By this step, the sending PE device has completed sending the group identifiers of the PW to the receiving PE device, where the group identifiers are saved. Steps 303 through 304 are completed in the PW setup phase. After the PW is established, the two PE devices can use the PW to transmit packets. In case an event, a network problem for example, occurs causing the failure of a certain PW group, the sending PE can send a wildcard message to notify that the PWs in the group are unreachable. The procedure is as follows:

At step 305, the sending PE device sends a wildcard PW unreachable message to notify the receiving PE device of the failure of the PW group.

A mask is used in the message to indicate the grouping method of the affected PW group. The format and length of the mask are the same as those of the target PW group identifier sequence. In this embodiment, they are the same as those of the PW group identifier sequence. In the mask, the significant grouping method bits are set to 1 and the insignificant grouping method bits are set to 0. Table 3 shows the mask for the target PW group identifier sequence shown in Table 2.

TABLE 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0 0 0 0 0 0 0 0 0 0 0 0|1 1 1 1 1 1 1 1 1 1 1 1 1 1 1 1|
+-+-+-+-+-+-+-+-+-+-+-+-+-+-+-+-+-+-+-+-+-+-+-+-+-+-+-+-+-+-+-+-+
```

In this embodiment, a new PW Grouping TLV is introduced to carry the target PW group identifier sequence and mask, as shown in Table 4. The first two bits are the Unknown bit and the Forwarding bit defined in the LDP protocol. They are insignificant in this TLV and must be set to 0 in practice. For detailed description of them, refer to RFC 3036.

TABLE 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|PW Grouping TLV (???)        |            Length            |
+-+-+-+-+-+-+-+-+-+-+-+-+-+-+-+-+-+-+-+-+-+-+-+-+-+-+-+-+-+-+-+-+
|                         Grouping Value                         |
+-+-+-+-+-+-+-+-+-+-+-+-+-+-+-+-+-+-+-+-+-+-+-+-+-+-+-+-+-+-+-+-+
|                           Mask Value                           |
+-+-+-+-+-+-+-+-+-+-+-+-+-+-+-+-+-+-+-+-+-+-+-+-+-+-+-+-+-+-+-+-+
```

The value for the PW Grouping TLV field must be assigned by the IANA, and it is marked ??? here. The Length field indicates the total length of the Grouping Value field and the Mask Value field. It can be the actual number of bytes, the actual number of bits, the actual number of bytes divided by 2 (for two-byte alignment), or the actual number of bytes divided by 4 (for four-byte alignment). The Grouping Value field and the Mask Value field must be identical in length. That is, the number of bits for the Grouping Value field must be identical to that for the Mask Value field. Fill in the Grouping Value field with the target PW group identifier sequence, and the Mask Value field with the mask.

Actually, the PW Grouping TLV can also be used to carry the group identifiers of the PW at step 303. For this purpose, fill in the Grouping Value field with the PW group identifier sequence of the PW and set all bits of the Mask Value field to 1.

The use of fields for carrying group identifiers and the grouping method mask in this embodiment allows the message sent out to carry the group identifiers assigned with different grouping methods.

At step 306, the receiving PE device receives the PW unreachable message, which carries information about the affected PW group. Then its processing unit traverses all PWs from the sending PE device to identify which PWs are affected.

In this embodiment, the receiving PE device does not know what each group identifier of a PW means. Thus, identifying which PWs are affected at step 306 comprises: the processing unit of the receiving PE device traversing in the storage unit each PW from the sending PE device, bitwise ANDing the PW group identifier sequence of the PW and the mask received through the second interface unit, and comparing the AND result with the received PW group identifier; if they are identical, identifying that the PW is affected, and if not, unaffected. Thus, the affected PWs are identified after all PWs are traversed.

After processing the wildcard PW unreachable message in accordance with steps 305 and 306, the receiving PE device identifies the affected PWs.

The wildcard unreachable messages may carry PW groups created with different grouping methods depending on failure causes. For example, grouping based on the physical ports connected to ACs is used if a physical port fails causing the failure of the PWs carried on it; grouping based on the public network LSPs is used if an LSP fails causing the failure of the PWs carried on it. On the basis of steps 301 through 304, the sending PE device, at step 305, notifies the receiving PE device of the affected PW group and the grouping method. The receiving PE device, at step 306, identifies the PWs in the affected PW group created with the notified grouping method. In this way, the multi-methods supporting wildcard messages can be transmitted and processed.

Steps 305 and 306 describe how PW information is processed when a wildcard PW unreachable message is sent. The same procedure is applicable to wildcard reachable messages sent when a network problem is removed or when a PW group recovers for example.

By now, the description of embodiment 1 covers the situation where all PWs in a group fail. In practice, there may be the situation where the PWs in the intersection of two PW groups fail. To handle the situation, the PE sending device, at step 305, can set the Grouping Value field to carry the intersection of the two PW group identifiers, and the Mask Value field to carry the mask matching the two groups. This solution applies to the intersection of multiple PW groups. For example, the PW group identifier sequence takes the format shown in Table 1, and the group identifiers to be carried are 1100100b assigned with grouping method Group II, and 1100101b assigned with grouping method Group I. Table 5 shows how the identifier of the intersection of the two PW groups is presented and Table 6 shows the mask.

TABLE 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0 0 0 0 0 1 1 0 0 1 0 1|0 0 0 0 0 0 0 0 0 1 1 0 0 1 0 0|
+-+-+-+-+-+-+-+-+-+-+-+-+-+-+-+-+-+-+-+-+-+-+-+-+-+-+-+-+-+-+-+-+
```

TABLE 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1 1 1 1 1 1 1 1 1 1 1 1 1 1 1 1|1 1 1 1 1 1 1 1 1 1 1 1 1 1 1 1|
+-+-+-+-+-+-+-+-+-+-+-+-+-+-+-+-+-+-+-+-+-+-+-+-+-+-+-+-+-+-+-+-+
```

When implementing this embodiment, the sending and receiving PE devices can use the negotiation procedure defined in RFC 4447 to negotiate whether to use PW group information. If either of the PE devices does not support the method of the present invention, one PW reachable or unreachable message will be sent per affected PW. This decreases performance.

The above is the procedure for advertising and processing PW information in this embodiment.

Figure 4:
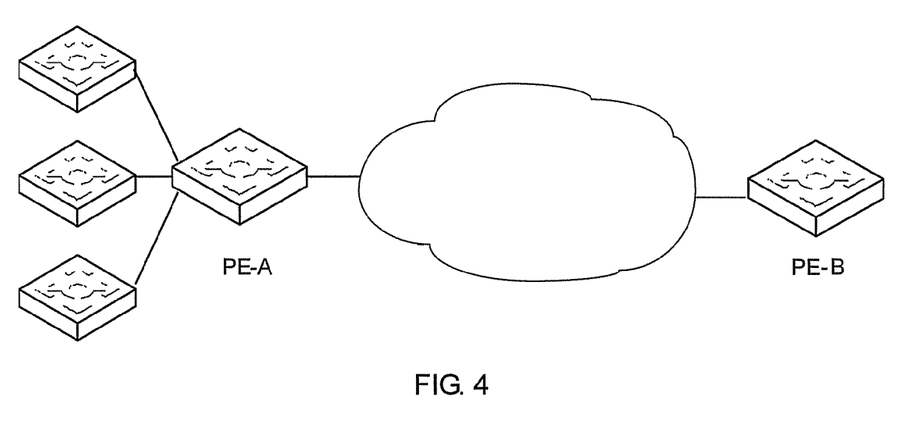
FIG. 4 is a network structure in accordance with embodiment 1 of the present invention.

The following uses an example to describe the detailed procedure of embodiment 1. FIG. 4 is the network structure diagram for the example, where PE-A represents the sending PE device, PE-B represents the receiving PE device, and the cloud represents the network between PE-A and PE-B. Assume that there are six PWs between PE-A and PE-B. These six PWs are created on three physical ports on PE-A and tunneled to PE-B through two LSPs, as shown in Table 7.

TABLE 7

|  | PW | | | | | |
| --- | --- | --- | --- | --- | --- | --- |
|  | 1 | 2 | 3 | 4 | 5 | 6 |
| Underlying LSP | 1 | 1 | 1 | 1 | 2 | 2 |
| Physical port | 1 | 2 | 3 | 1 | 2 | 3 |

The detailed procedure for advertising and processing PW information is as follows:

1. After the LDP session between PE-A and PE-B is established, PE-A sends Label Mapping messages to PE-B. Each PW entry contained in a Label Mapping message containing the PW identifier sequence of the PW.

Assume that the PW group identifier sequence field is divided into two 16-bit subfields: the high-order 16 bits for the underlying LSP and the low-order 16 bits for the underlying physical port. Table 8 shows the grouping methods, group identifiers and PW identifier sequence of each PW. (The leading 0x of a string indicates that this is a hexadecimal number.)

TABLE 8

|  | PW | | | | | |
| --- | --- | --- | --- | --- | --- | --- |
|  | 1 | 2 | 3 | 4 | 5 | 6 |
| Underlying LSP | 1 | 1 | 1 | 1 | 2 | 2 |
| Physical port | 1 | 2 | 3 | 1 | 2 | 3 |
| PW group information | 0x10001 | 0x10002 | 0x10003 | 0x10001 | 0x20002 | 0x20003 |

2. After receiving the messages from PE-A, PE-B saves information about the PWs as well as their PW group identifier sequence. In this embodiment, PE-B saves the PW group identifier sequence as it is without any processing because PE-B is not expected to know what the sequence means or which bits are for which PW group.

3. PE-A detects that a certain PW group fails. For example, it detects that the group of PWs carried on LSP 1 fails. PE-A needs to notify PE-B of the failure of these PWs.

Wherein, PE-A can send a Label Withdraw message or a Notification message containing the Status TLV. In the message, it carries the PW Grouping TLV, which comprises Grouping Value and Mask Value.

The Grouping Value indicates the failed PW group, and its value is 0x10000 in this example. The value of high-order bit segment set to 1 indicates that the affected PW group is LSP 1 and that all low order bits are set to 0 indicates that the grouping is not based on physical ports. To sum up, the Grouping Value here means that all PWs tunneled through LSP 1 are affected regardless of on which physical ports they are carried.

The Mask Value limits the applicable scope of the PW group. By ANDing the PW group identifier sequence saved from the LDP Mapping messages and the mask value, the receiving PE device can get the identifier of the affected PW group. In this example, the mask value should be set to 0xfff0000.

4. After receiving the message from PE-A, PE-B extracts the Grouping Value and the Mask Value from the PW Grouping TLV field, traverses each PW received from PE-A to bitwise AND the saved PW group identifier sequence and the Mask Value, and compares the AND result with the Grouping Value. If they are identical, PE-B identifies that the PW belongs to the affected PW group. The subsequent procedure is performed in compliance with the protocol.

As the example shows, as PE-A and PE-B can transmit and process wildcard messages using different grouping methods, great PW information processing flexibility is achieved.

In this embodiment, the receiving PE device does not need to know the meanings of the group identifiers advertised to it. It identifies the affected PWs covered by a wildcard message by using the group identifier and the grouping mask in a certain format in conjunction with the saved PW group identifier sequence.

Embodiment 2

Unlike in embodiment 1, where the receiving PE device does not have to know what the group identifiers of a PW mean, the transmitting and receiving PE devices in embodiment 2 negotiate the meanings of PW group identifiers in advance.

Figure 5:
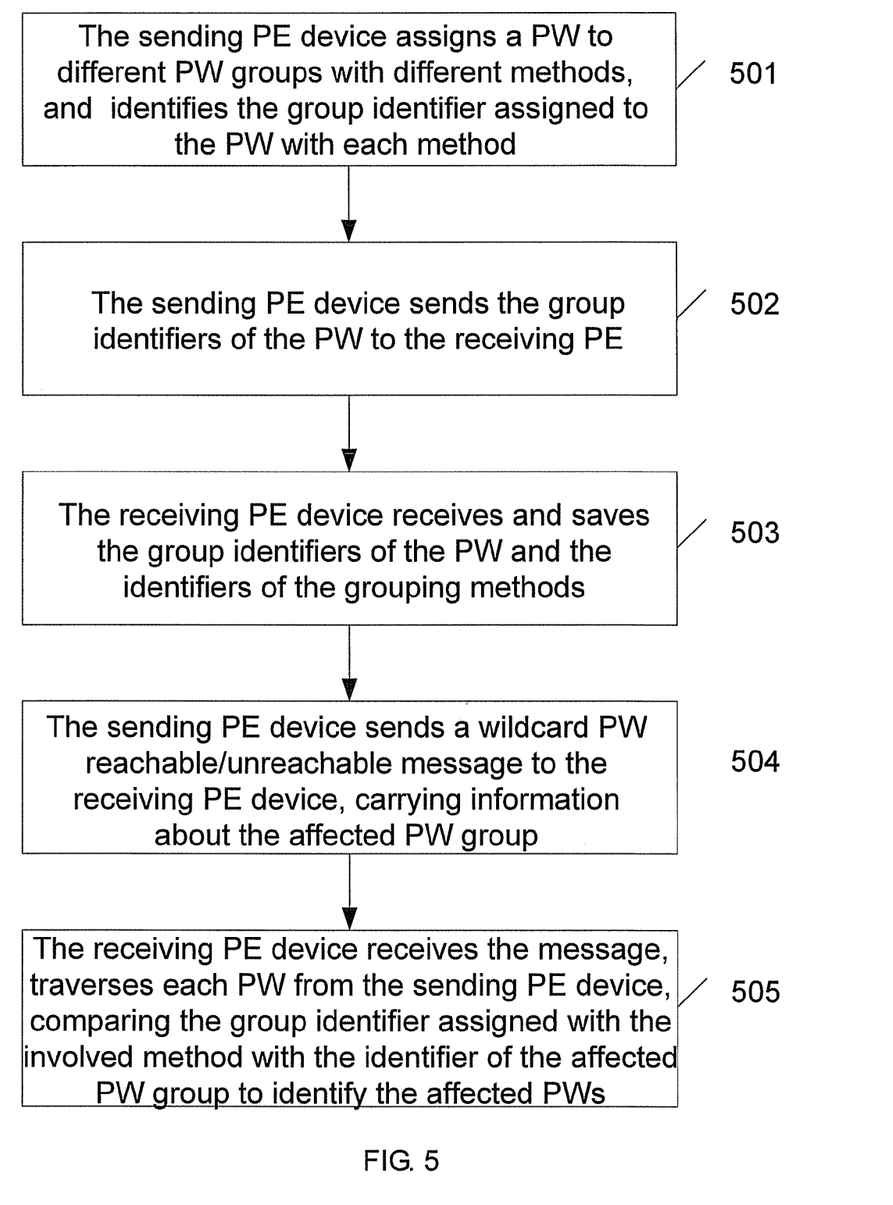
FIG. 5 is a flow chart illustrating a method for advertising and processing PW information in accordance with embodiment 2 of the present invention.

FIG. 5 is a flow chart illustrating a method for advertising and processing PW information in accordance with embodiment 2 of the present invention. The method can be implemented in the transmitting and receiving PE devices as shown in FIG. 2. As shown in FIG. 5, embodiment 2 comprises these steps:

At step 501, the sending PE device uses different grouping methods to assign a PW to PW groups, and identifies the group identifier assigned to the PW with each grouping method.

Wherein, PW grouping is performed by the configuration unit with different grouping methods, which is the same as what is performed at step 301 in embodiment 1.

At step 502, the sending PE device sends to the receiving PE device the group identifiers of the PW.

Wherein, the sending PE device sends all the group identifiers of the PW when establishing the PW, before or after the PW is established. These group identifiers are delivered by the configuration unit independent of each other. To this end, the Label Mapping message is sent carrying multiple PW Grouping ID TLVs or Grouping IDs, each conveying a group identifier and its corresponding grouping method information. Wherein, the grouping method information can be presented explicitly in a field (by numbers or letters that can uniquely identify it), or implicitly inferred from the order of PW Grouping ID TLVs or Grouping IDs. In the explicit approach, the field used for carrying grouping method information can be one already defined for the message or a new one.

At step 503, the receiving PE device receives and saves all the group identifiers of the PW.

The receiving PE device negotiates with the sending PE device in advance the presentation method of group identifiers and grouping methods. Alternatively, the receiving PE device sets in advance the same presentation method of group identifiers and grouping methods as the sending PE device. At this step, the second interface unit of the receiving PE device receives all the group identifiers of the PW and the grouping method information sent at step 502, and finds out what the received grouping method information and group identifiers mean according to the predefined presentation method. Meanwhile, the second interface unit saves the group identifiers and grouping method information to the storage unit.

By this step, the sending PE device has completed sending the group identifiers of the PW to the receiving PE device, where the group identifiers are saved. The procedure is completed in the PW setup phase. After the PW is established, the two PE devices can use the PW to transmit packets. When a wildcard PW unreachable or reachable message is to be sent, the following procedure can be taken:

At step 504, the sending PE device sends a wildcard PW unreachable or reachable message to the receiving PE device, carrying information about the affected PW group.

Wherein, the sending PE device sends the message when its configuration unit detects that a certain PW group has failed or recovered from a failure. In the message, it can carry the group identifier and the PW grouping method information of the affected PW group. If the implicit grouping method is adopted, the message must carry all PW Grouping ID TLVs or Grouping IDs so that the receiving device can infer the grouping method from the sequence of the TLVs or IDs. In addition, the PW Grouping ID TLV or Grouping ID that conveys the group identifier assigned with an unconcerned grouping method must be set to void, for example to 0. If explicit grouping method presentation is adopted, the message can carry only the group identifier and the information of the concerned grouping method.

At step 505, the receiving PE device receives the PW reachable or unreachable message, and traverses each PW received from the sending PE device to identify whether the PW belongs to the affected PW group.

Wherein, the second interface unit of the receiving PE device receives the PW reachable or unreachable message, and delivers the group identifier and the grouping method identifier (if any) to the processing unit. The processing unit identifies the grouping method according to the received information, and traverses in the storage unit each PW from the sending PE to compare the PW group identifier assigned with the identified grouping method with the group identifier carried in the received reachable or unreachable message. If they are identical, the PW being traversed is affected; if not, unaffected.

By this step, the procedure of embodiment 2 for advertising and processing PW information finishes. Similar to embodiment 1, if the PWs affected by the wildcard PW reachable or unreachable message are in the intersection of two or more groups, the message can carry multiple group identifiers and information about their grouping methods.

The following uses an example to describe the detailed procedure of embodiment 2. This example uses the network structure shown in FIG. 4 and the mapping table shown in Table 7.

The detailed procedure of embodiment 2 for advertising and processing PW information comprises:

1. After the LDP session between PE-A and PE-B is established, PE-A sends Label Mapping messages to PE-B. Each PW entry contained in a Label Mapping message contains the group identifiers of the PW and information about their grouping methods.

Assume explicit grouping method presentation is adopted. To achieve this, a field named Grouping Manner is added to the PW Grouping ID TLV to carry the grouping method information. If the field is set to 1, the grouping is performed by underlying LSP; if the field is set to 0, the grouping is performed by physical port. The Label Mapping message sent by PE-A for each PW carries two PW Grouping ID TLVs, each carrying the information of one grouping method and the corresponding group identifier. For example, in the Label Mapping message for PW3, the first PW Grouping ID TLV carries Grouping Value 1, which indicates that the group identifier is 1, and Grouping Manner 1, which indicates that the grouping is performed by underlying LSP; the second PW Grouping ID TLV carries Grouping Value 3, which indicates that the group identifier is 3, and Grouping Manner 0, which indicates that the grouping is performed by physical port. For other PWs, the group identifiers and grouping method information are transmitted in the same way.

Alternatively, explicit grouping method presentation can be adopted for the receiving PE device to infer the grouping method from the order of PW Grouping ID TLVs. The details are omitted here.

2. After receiving the messages from PE-A, PE-B saves the group identifiers of each PW and the grouping method information. Because PE-B in this embodiment knows the meanings of the fields in the PW Grouping ID TLV, it can identify each group identifier assigned to a PW and the used grouping method. Thus, PE-B can save the group identifiers and their respective grouping methods for each PW.

3. PE-A detects that a PW group fails because LSP 1 fails for example. PE-A needs to notify PE-B of the failure of the group of PWs carried on LSP 1.

PE-A can do this by sending a Label Withdraw message or a Notification message containing the Status TLV. The message carries the PW Grouping TLV field, which takes the same format as the aforesaid PW Grouping TLV that contains a newly defined Grouping Manner field. In the PW Grouping TLV of the Label Withdraw or Notification message, the Grouping Value takes 1, which indicates that PW group 1 has failed; the Grouping Manner also takes 1, which indicates that the grouping method for the failed PW group is LSP based. To sum up, the PW Grouping TLV here means that all PWs tunneled through LSP 1 are affected regardless of on which physical ports they are carried.

4. After receiving the message from PE-A, PE-B extracts and interprets the Grouping Value and the Grouping Manner from the PW Grouping TLV field. Because the Grouping Manner takes 1, PE-B identifies that the grouping method for the affected PW group is LSP-based. Because the Grouping Value takes 1, PE-B identifies that the affected PW group is group 1. To sum up, PE-B interprets the two fields as all PWs tunneled through LSP 1 having failed.

PE-B traverses each PW received from PE-A to compare the group identifier assigned with the LSP-based grouping method with the Grouping Value extracted from the Label Withdraw or Notification message. If they are identical, PE-B identifies that the PW belongs to the affected PW group. The subsequent procedure is performed in compliance with the protocol.

In embodiment 2, because the receiving PE device knows the meanings of PW group identifiers, when traversing a PW, it looks at only the concerned group identifiers. This decreases traversal complexity.

As evident from the two embodiments, the methods and PE devices using the present invention deliver these benefits: improved performance of large-scale application because multi-method based PW grouping are supported; ease of interpretation at the application layer and thus ease of deployment because the transmitted identifiers of PW groups are certain.

In fact, besides the support for multi-method based PW grouping, the methods and PE devices of the present invention also support the use of a single grouping method or no grouping, as described in the BACKGROUND section. In a scenario where multiple grouping methods coexist, wildcard messages can be used to improve efficiency. In a scenario where PWs are grouped with only one grouping method or not grouped at all, the protocol-compliant messages such as Label Mapping, Label Withdraw, and Status messages can be used to implement PW label reclamation and advertisement.

It is to be understood that the above description is intended to be illustrative and not restrictive. Various modifications, alternate constructions, and equivalents will be obvious to those with skill in the art. Thus, the scope of the present invention is limited solely by the metes and bounds of the appended claims.

What is claimed is:

1. A sending provider edge (PE) device for advertising and processing pseudo-wire (PW) information, the sending PE device comprising:
    a processing unit;
    a storage unit;
    an interface unit;
    a representation of a plurality of PWs stored in the storage unit;
    a representation of a plurality of grouping methods stored in the storage unit;
    program instructions executable by the processing unit and stored in the storage unit to assign at least one of the plurality of grouping methods to each of the plurality of PWs, thereby creating a set of PW groups;
    program instructions executable by the processing unit and stored in the storage unit to determine a group identifier for each PW group in the set of PW groups;
    program instructions executable by the processing unit and stored in the storage unit to transmit a sequence containing the determined group identifiers to a receiving PE device via the interface unit, wherein the sequence of the group identifiers is constructed in a pre-determined format represented by a sequence of group identifiers indexed by their respectively associated grouping methods, and a mask;
    program instructions executable by the processing unit and stored in the storage unit to determine that a PW group in the set of PW groups is impacted by an event; and
    program instructions executable by the processing unit and stored in the storage unit to transmit a group-based notification message to the receiving PE device containing information that identifies the PW group impacted by the event.

2. The sending PE device of claim 1, wherein the sequence of group identifiers and the mask have an identical length.

3. The sending PE device of claim 1, wherein program instructions executable by the processing unit and stored in the storage unit to transmit a sequence containing the determined group identifiers to a receiving PE device via the interface unit are arranged to transmit the group identifiers in a PW group identifier advertisement message.

4. The sending PE device of claim 1, wherein the event is selected from the group consisting of a failure of the PW group impacted by the event and a recovery of the PW group impacted by the event.

5. The sending PE device of claim 1, wherein each of the plurality of grouping methods are based on a technique selected from the group consisting of an arrangement of physical ports and a label switching protocol.

6. The sending PE device of claim 1, wherein the program instructions to determine that the PW group in the set of PW groups is impacted by the event include instructions to perform a bitwise AND of the sequence of group identifiers and the mask.

7. The sending PE device of claim 1, wherein the PW group in the set of PW groups is impacted by the event is an intersection of at least two PW groups.

8. The sending PE device of claim 1, wherein a group identifier in the sequence of the group identifiers comprises information about a physical port associate with the group.

9. A receiving provider edge (PE) device for receiving and processing pseudo-wire (PW) information, the receiving PE device comprising:
    a processing unit;
    a storage unit;
    an interface unit;
    program instructions executable by the processing unit and stored in the storage unit to receive, via the interface unit, group identifiers each associated with one or more PWs and store a representation of the received group identifiers in the storage unit;
    program instructions executable by the processing unit and stored in the storage unit to receive, via the interface unit, a PW notification message carrying a given group identifier, wherein the given group identifier is one of the received group identifiers, and wherein the PW notification message relates to an event impacting the PWs associated with the given group identifier; and
    program instructions executable by the processing unit and stored in the storage unit to compare the given group identifier to the stored group identifiers and to extract the given group identifier and a grouping method carried in the PW notification message, thereby determining the impacted PWs associated with the given group identifier.

10. The receiving PE device of claim 9, wherein program instructions executable by the processing unit and stored in the storage unit to receive, via the interface unit, group identifiers each associated with one or more PWs are arranged to receive a group identifier advertisement message containing the group identifiers each associated with one or more PWs.

11. The receiving PE device of claim 9, wherein the grouping method is based on a technique selected from the group consisting of an arrangement of physical ports and a label switching protocol.

12. The receiving PE device of claim 9, wherein the event is selected from the group consisting of a failure of the PW group impacted by the event and a recovery of the PW group impacted by the event.

13. A method, performed by a sending provider edge (PE) device, for advertising and processing pseudo-wire (PW) information, comprising:
- assigning a PW to a first group, wherein the first group is associated with a first grouping method, and wherein the first group is associated with a first group identifier;
- assigning the PW to a second group, wherein the second group is associated with a second grouping method, and wherein the second group is associated with a second group identifier;
- sending, to a receiving PE device, an indication of the PW and a sequence of group identifiers, wherein the sequence includes the first group identifier and the second group identifier;
- making a determination that the first group is subject to an event; and
- responsive to making the determination, sending, to the receiving PE device, a wildcard notification message, wherein the wildcard notification message contains the first group identifier.

14. The method of claim 13, wherein sending to the receiving PE device the sequence of group identifiers comprises:
- encoding the sequence of group identifiers in a pre-determined format; and
- sending the encoded sequence of group identifiers in a message used for advertising group identifiers.

15. The method of claim 14, wherein the message used for advertising group identifiers is a label mapping message.

16. The method of claim 13, wherein sending to the receiving PE device the wildcard notification message comprises:
- encoding a target PW group sequence field, wherein the first group identifier is specified in a field associated with the first grouping method and fields associated with all other grouping methods are set to zero; and
- encoding a mask, wherein the encoded mask and the encoded target PW group sequence field are of the same length, and wherein mask bits corresponding to the first grouping method are set to ones, and all other mask bits are set to zeros.

17. The method of claim 13, wherein sending the sequence of group identifiers to the receiving PE device comprises:
- sending the sequence of group identifiers and a grouping method associated with each group identifier in the sequence of group identifiers, wherein the grouping method is selected from the group consisting of the first grouping method and the second grouping method.

18. The method of claim 13, wherein sending the sequence of group identifiers to the receiving PE device comprises:
- arranging the group identifiers in the sequence of group identifiers in a pre-determined order and using the pre-determined order to implicitly indicate grouping methods associated with each group identifier.

19. The method of claim 13, wherein the event is selected from the group consisting of a failure of the first group and a recovery of the first group.

20. The method of claim 13, wherein each of the first grouping method and the second grouping method are based on a grouping technique selected from the group consisting of an arrangement of physical ports and a label switching protocol.

* * * * *